United States Patent [19]
Takigawa et al.

[11] Patent Number: 5,955,001
[45] Date of Patent: *Sep. 21, 1999

[54] ANTIFERROELECTRIC LIQUID CRYSTAL COMPOSITION AND LIQUID CRYSTAL INDICATING ELEMENT

[75] Inventors: Kenji Takigawa, Nishio; Hitoshi Hayashi, Okazaki; Katsuhide Kikuchi, Kariya, all of Japan

[73] Assignee: Nippon Soken, Inc., Nishio, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/749,152

[22] Filed: Nov. 14, 1996

Related U.S. Application Data

[63] Continuation of application No. 08/419,015, Apr. 7, 1995, abandoned.

[30] Foreign Application Priority Data

Apr. 8, 1994 [JP] Japan .................................. 6-070689

[51] Int. Cl.⁶ .......................... C09K 19/12; C09K 19/34; C09K 19/30; C09K 19/20
[52] U.S. Cl. ............................. 252/299.66; 252/299.63; 252/299.62; 252/299.61; 252/299.67
[58] Field of Search ....................... 252/299.66, 299.62, 252/299.67

[56] References Cited

U.S. PATENT DOCUMENTS

| | | | |
|---|---|---|---|
| 4,576,732 | 3/1986 | Isogai | 252/299.65 |
| 4,754,051 | 6/1988 | Sasaki | 560/8 |
| 4,921,632 | 5/1990 | Nakamura et al. | 252/299.01 |
| 4,961,874 | 10/1990 | Takeuchi | 252/299.6 |
| 5,046,823 | 9/1991 | Mori | 359/56 |
| 5,151,213 | 9/1992 | Reiffenrath | 252/299.6 |
| 5,204,020 | 4/1993 | Suzuki | 252/299.67 |
| 5,264,150 | 11/1993 | Yui et al. | 252/299.64 |
| 5,316,694 | 5/1994 | Murashiro | 252/299.61 |
| 5,352,382 | 10/1994 | Johno | 252/299.65 |
| 5,356,562 | 10/1994 | Greenfield | 252/299.63 |
| 5,364,560 | 11/1994 | Mizukami et al. | 252/299.65 |
| 5,364,561 | 11/1994 | Isozaki et al. | 252/299.65 |
| 5,374,375 | 12/1994 | Yui | 252/299.65 |
| 5,378,392 | 1/1995 | Murashiro | 252/299.01 |
| 5,378,396 | 1/1995 | Yui | 252/299.65 |
| 5,393,460 | 2/1995 | Okabe | 252/299.65 |
| 5,417,885 | 5/1995 | Suzuki | 252/299.65 |
| 5,424,005 | 6/1995 | Suzuki et al. | 252/299.65 |
| 5,433,887 | 7/1995 | Isozaki et al. | 252/299.64 |
| 5,534,190 | 7/1996 | Johno et al. | 252/299.65 |

FOREIGN PATENT DOCUMENTS

| | | |
|---|---|---|
| 330491 | 8/1989 | European Pat. Off. . |
| 339987 | 11/1989 | European Pat. Off. . |
| 0517504A1 | 12/1992 | European Pat. Off. . |
| 0525737A1 | 2/1993 | European Pat. Off. . |
| 0562627A1 | 9/1993 | European Pat. Off. . |
| 0582519A1 | 2/1994 | European Pat. Off. . |
| 6271852 | of 0000 | Japan . |
| 1-139951 | 6/1989 | Japan . |
| 1213390 | 8/1989 | Japan . |
| 1316339 | 12/1989 | Japan . |
| 1316367 | 12/1989 | Japan . |
| 2 28128 | 1/1990 | Japan . |
| 2-69440 | 3/1990 | Japan . |

OTHER PUBLICATIONS

Nishiyama et al., "Effect of Size of the Lateral Substituent at the Chiral Centre on the Stability of Some Chiral Smectic Liquid–crystalline Phases" Journal of Materials Chemistry 3(1993)No. 2, Cambridge, GB. pp. 149–159.

Suzuki et al., "New Fluorine–Containing Ferroelectric Liquid Crystal Compounds Showing Tristable Switching" Liquid Crystals, 1989, vol. 6, No. 2, London, pp. 167–174.

Chandani, et al: "Iristable Switching in Surface Stabilized Ferroelectric Liquid Crystals with a Large Spontaneous Polarization", Japanese Journal of Applied Physics, vol. 27, No. 5, May 1988, pp. L729–L732.

Meyer:, "Ferroelectric Liquid Crystals; A Review", Mol.Cryst.Liq.Cryst., 1977, vol. 40. pp. 33–48.

*Primary Examiner*—C. H. Kelly
*Attorney, Agent, or Firm*—Pillsbury Madison & Sutro LLP

[57] ABSTRACT

An antiferroelectric composition comprising 70 wt % or more of a mixture consisting of two groups of compounds represented by the following general formula (I):

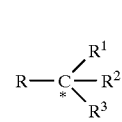

(I)

wherein each of R, $R^1$, $R^2$ and $R^3$ are an atom or an atomic group, R is an atomic group having the most carbon atoms, C* represents an asymmetric carbon, $R^1$, $R^2$, and $R^3$ are numbered in order of increasing number of carbon atoms (i.e. $R^1<R^2<R^3$), or, if two or more groups have the same number of carbon atoms, they are numbered in order of increasing atomic group weight or increasing atomic weight, and wherein one component of the mixture has $R^1$, $R^2$ and $R^3$ arranged clockwise when the molecule is viewed along the R—C bond, with the C* atom in front, and the other, counterclockwise. The composition provides an antiferroelectric liquid crystal composition having a lower crystal temperature and a wide liquid crystal temperature range with a small number of component compounds.

17 Claims, No Drawings

ANTIFERROELECTRIC LIQUID CRYSTAL COMPOSITION AND LIQUID CRYSTAL INDICATING ELEMENT

This is a continuation of application Ser. No. 08/419,015, filed on Apr. 7, 1995, which was abandoned upon the filing hereof.

BACKGROUND OF THE INVENTION

1. Field of the Invention

This invention relates to a liquid crystal composition, particularly to a liquid crystal composition having an antiferroelectric phase (chiralsmectic $C_A^*$ phase, hereinafter abbreviated to "$SmC_A^*$ phase"), more particularly this invention relates to an antiferroelectric liquid crystal composition suitable for use for a liquid crystal indication element.

2. Description of the Related Art

Recently, liquid crystal displays have become widely used as indication elements, due to their reduced thickness, light weight, low power consumption etc. However, most of these displays use TN (Twisted Nematic) type display comprising a nematic liquid crystal. Since the operation of TN displays is based on the anisotropy of the dielectric constant of the liquid crystal, the response speed is slow, and improvement is required.

In contrast, liquid crystal devices comprising chiralsmectic C phase (hereinafter abbreviated as "SmC* phase") liquid crystals, which are ferroelectric and were discovered by Meyer et. al., have high response speeds and memory characteristics. Thus, in order to utilize these characteristics, application of these ferroelectric liquid crystals to displays have been intensively researched. However, the good orientation and memory characteristics required for this indication method are difficult to realize in practice. Many problems remain to be solved, such as sensitivity to external shocks, etc.

On the other hand, recently, an antiferroelectric phase (hereinafter abbreviated as "$SmC_A^*$ phase") has been discovered by Chandani et. al. which shows three stable states on the lower temperature side of said SmC* phase. This antiferroelectric liquid crystal shows a thermodynamically stable phase wherein dipoles are arranged in antiparallel in every adjacent layer, and exhibits an electric field-induced phase transition between the antiferroelectric phase and the ferroelectric phase which is characterized by a clear threshold and double hysteresis in response to applied voltage. Investigations on indication methods utilizing this switching behavior have already begun.

Liquid crystal compounds having an antiferroelectric phase are disclosed in Japanese Unexamined Patent Publication (Kokai) Nos. 1-213390, 1-316339, 1-316367, 2-28128 etc., and their number continues to increase as new compounds are published. However, many of the antiferroelectric liquid crystals that have been manufactured until now have high melting points and their antiferroelectric phase occurs at temperatures far higher than room temperature. Therefore, it is difficult to manufacture a liquid crystal element using a single antiferroelectric liquid crystal compound, and usually, several or more antiferroelectric liquid crystal compounds must be mixed to obtain useful physical properties.

When the switching characteristics of an antiferroelectric phase are to be applied to a liquid crystal display, e.g. display for cars, the liquid crystal compositions used must have a stable liquid crystal phase over a temperature range including room temperature. Particularly, a technique for preventing crystallization of liquid crystals at lower temperatures is required. However, conventional liquid crystal compositions have narrow liquid crystal temperature ranges, and the crystallization temperature thereof is relatively high. Hitherto, in order to decrease the crystallization temperature, a compound having particularly low crystallization temperature has been blended with liquid crystal compositions, or the number of the components of a liquid crystal composition has been increased, for example, to 10 to 20 components. However, compounds having a low crystallization temperature have a small tilt angle and often have a high threshold temperature. On the other hand, the use of multi-component compounds causes problems in balancing the properties of the liquid crystal composition.

SUMMARY OF THE INVENTION

Therefore, an object of the present invention is to provide a liquid crystal composition having a low crystallization temperature and a wide liquid crystal temperature range with a small number of components.

The present invention is an antiferroelectric composition comprising 70 wt % or more of a mixture consisting of two components represented by the following general formula (I):

(I)

wherein each of R, $R^1$, $R^2$ and $R^3$ are an atom or an atomic group, R is the atomic group having the most carbon atoms, C* represents an asymmetric carbon, R,$R^1$, $R^2$ and $R^3$ are numbered in order of increasing number of carbon atoms (i.e. $R^1 < R^2 < R^3$), or, if two or more groups have the same number of carbon atoms, they are numbered in order of increasing atomic group weight or increasing atomic weight, and wherein one component of the mixture has $R^1$, $R^2$ and $R^3$ arranged clockwise when the molecule is viewed along the R—C bond, with the C* atom in front, (hereinafter referred to as (+)), and the other, counterclockwise (hereinafter referred to as (−)).

When a liquid crystal composition having a low crystallization temperature is prepared, the usual method is to blend several to tens of liquid crystal compounds. However, the crystallization of a liquid crystal composition is a transition from a liquid crystal state having high a freedom of molecular motion to a crystal state having a regular arrangement in three dimensions. One way to lower the crystallization temperature of a liquid crystal composition is to use individual components with low crystallization temperatures. Another way is to mix components with differences in constitution, to decrease the tendency of the molecules to form an ordered solid, thereby lowering the crystallization temperature. Using this conception, the inventors attained a method of preparing a liquid crystal composition based on differences in length and type of atom(s) or atomic group(s) connected to the asymmetric carbon in the liquid crystal.

Examples of $R^1$ are H, $CH_3$, $C_2H_5$, $C_3H_7$, $CF_3$ and $C_2F_5$, preferably H.

Examples of $R^2$ are $CH_3$, $CF_3$, $C_2H_5$, $C_3H_7$, $C_2F_5$, $CHF_2$ and $CH_2F$, preferably $CH_3$, $CF_3$ and $C_2H_5$.

Examples of $R^3$ are straight chained or branched alkyls having 4 to 14 carbon atoms or

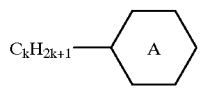

(wherein, k is an integer from 0 to 3, and

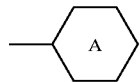

represents

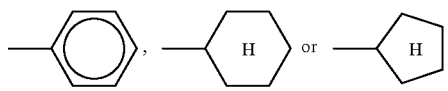

Preferably, $R^3$ is a straight chained or branched alkyl having 4 to 8 carbon atoms, more preferably it is a straight chained or branched alkyl having 6 or 8 carbon atoms.

An example of R is the part of the molecule enclosed by a dotted line in the following formula (II).

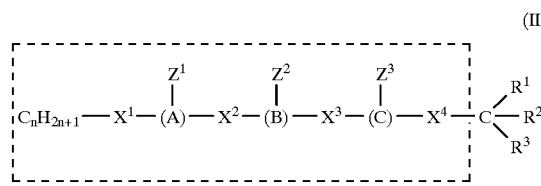

In the formula (II), n is an integer from 4 to 14, A, B and C are selected from the following formula (III), $X^1$, $X^2$, $X^3$ and $X^4$ are selected from the following formula (IV), and $Z^1$, $Z^2$ and $Z^3$ are selected from the following formula (V).

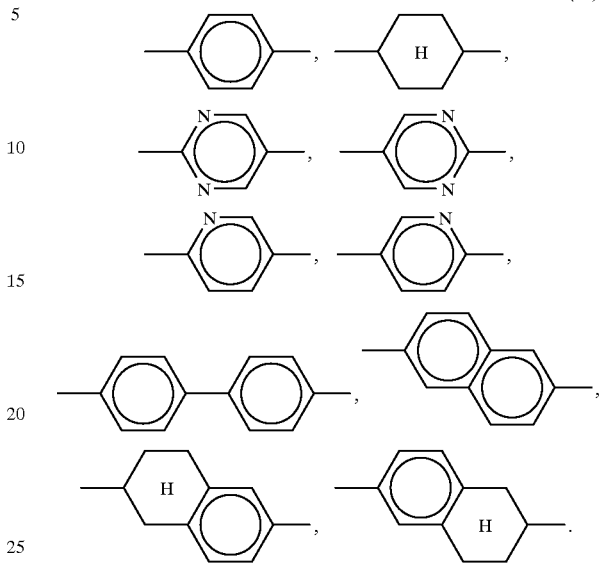

(IV) single bond (—), —COO—, —OCO—, —CO—, —O—, —C≡C—.

(V) H, F, Cl, Br, CN, $CH_3$.

In the mixture of compounds represented by the formula (II), the presence of at least two compounds, different in $X^1$ from each other, has a larger effect of decreasing the crystallization temperature.

Examples represented by the formula (I) is as follows.

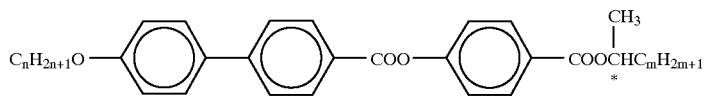

(1)

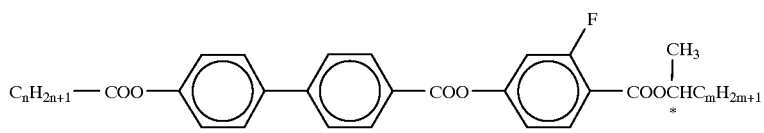

(2)

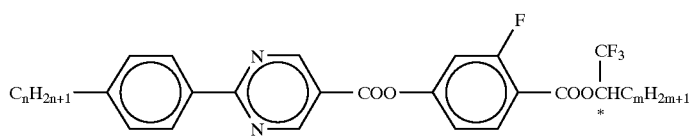

(3)

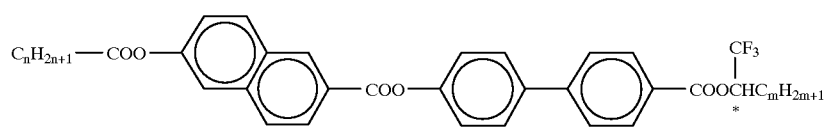

(4)

-continued
(5)
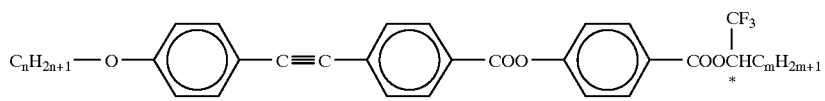
(6)
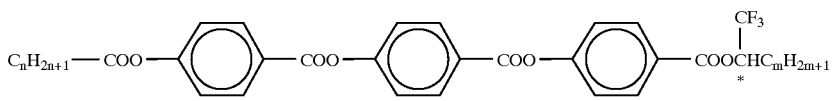
(7)
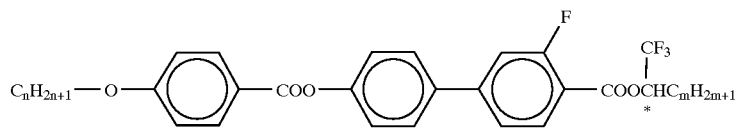
(8)
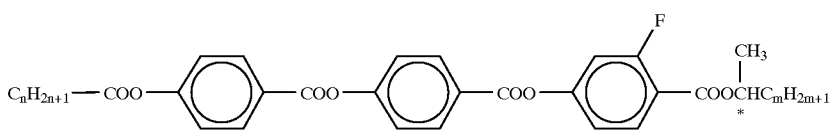
(9)
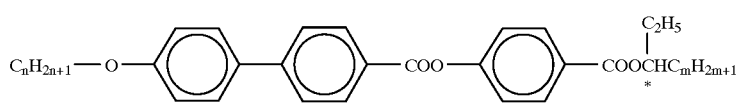
(10)
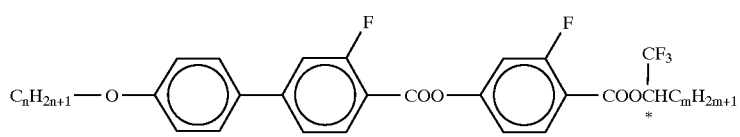
(11)
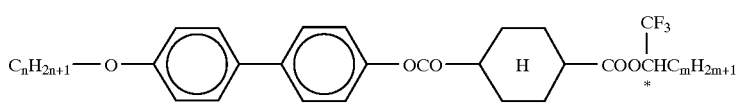
(12)
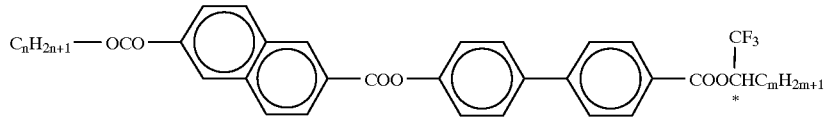
(13)
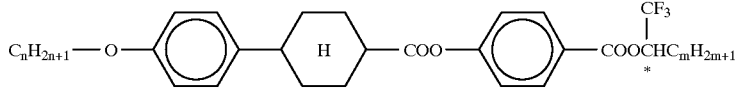
(14)
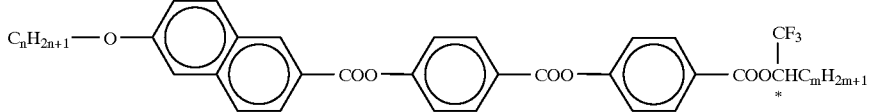

-continued

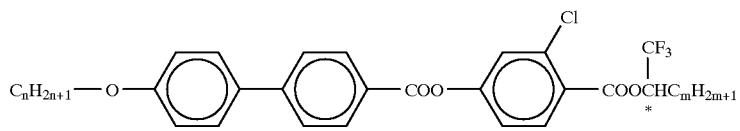

(15)

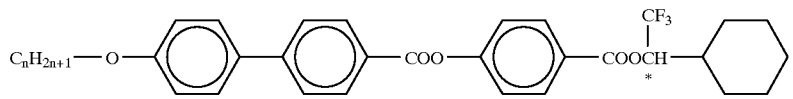

(16)

In the above formulas (1) to (16), n is an integer from 4 to 14, m is an integer from 4 to 14, preferably, n is 8, 9 or 10 and m is 6 or 8.

The ratio of (+):(−) molecules can be 20:80 to 80:20 by weight.

EXAMPLE 1

The composition A was prepared by using compounds No. 1 to No. 3 (all (+)) shown in Table 1. The phase series of the compounds No. 1 to No. 3 is shown in Table 2, wherein the unit of the numerals is °C., and DSC determination results are shown in Table 3.

composition A was changed from (+) to (−) to prepare composition B. The DSC determination result is shown in Table 4.

TABLE 4

$$Cry \xrightarrow{18\,°C.} S_{CA}{}^* \xrightarrow{97\,°C.} S_A \xrightarrow{106\,°C.} I_{SO}$$

As is shown in Table 4, by changing the compound No. 2 from (+) to (−), the crystallization temperature was low-

TABLE 1

| Compound No. | Constitutional Formula | Composition (wt %) |
| --- | --- | --- |
| 1 | (+) $C_{10}H_{21}O$—⬡—⬡—COO—⬡—COOCH($CF_3$)$C_4H_9$ | 24.2 |
| 2 | (+) $C_{10}H_{21}O$—⬡—⬡—COO—⬡—COOCH($CF_3$)$C_6H_{13}$ | 39.4 |
| 3 | (+) $C_{10}H_{21}O$—⬡—⬡—COO—⬡—COOCH($CF_3$)$C_8H_{17}$ | 36.4 |

TABLE 2

| Compound No. | Cry—$S_{CA}{}^*$—$S_A$—$I_{SO}$ | | |
| --- | --- | --- | --- |
| 1 | 56.2° C. | 118.0° C. | 125.6° C. |
| 2 | 51.6° C. | 103.3° C. | 109.4° C. |
| 3 | 44.8° C. | 93.9° C. | 101.0° C. |

TABLE 3

$$Cry \xrightarrow{40°C.} S_{CA}{}^* \xrightarrow{96°C.} S_A \xrightarrow{105°C.} I_{SO}$$

The composition A has a crystallization temperature of 40° C., and is crystalline at room temperature, so that it is not used for displays. Accordingly, the compound No. 2 in the ered from 40° C. to 18° C., while the phase change temperature between the $S_A$ phase and $S_{CA}{}^*$ phase was unchanged. Thus the temperature range of the $S_{CA}{}^*$ phase increased by 22° C. Regarding the liquid crystal compound itself, the (+) and (−) enantiomers have the same crystallization temperature and the same phase transition enthalpy. Therefore, it is believed that the crystallization temperature of the composition B decreases because of the stereostructures of the atom(s) or atomic group(s) attached to the asymmetric carbon of a compound contained in composition B.

EXAMPLE 2

A composition C was prepared from compounds No. 4 to No. 6, all (+), shown in Table 5. The phase series of each of these compounds is shown in Table 6, wherein the unit of the numerals is °C.

TABLE 5

| Compound No. | Constitutional Formula | Composition (wt %) |
|---|---|---|
| 4 | 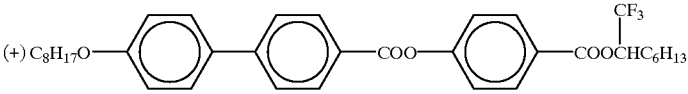 | 16.3 |
| 5 | 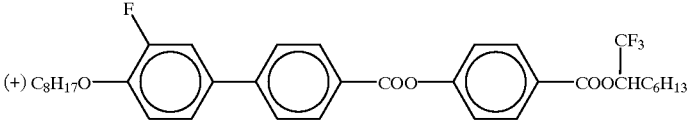 | 25.3 |
| 6 | 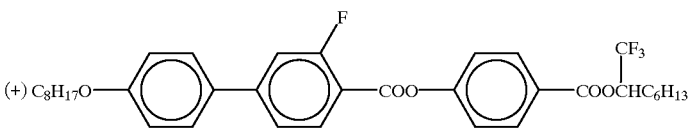 | 58.4 |

TABLE 6

| Compound No. | Cry—$S_{CA}$*—$S_A$—$I_{SO}$ | | |
|---|---|---|---|
| 4 | 87.9° C. | 115.5° C. | 125.1° C. |
| 5 | 68.0° C. | 89.2° C. | 97.8° C. |
| 6 | 44.7° C. | 90.9° C. | 105.9° C. |

Then, the compound No. 4 in the composition C was changed to (−), to prepare composition D. The DSC determination results of the compositions C and D are shown in Table 7, wherein the unit of the numerals is °C.

TABLE 7

| | Cry—$S_{CA}$*—$S_A$—$I_{SO}$ | | |
|---|---|---|---|
| Composition C | 58° C. | 92° C. | 106° C. |
| Composition D | 34° C. | 91° C. | 106° C. |

As in Example 1, the composition D also showed a reduced crystallization temperature, this time by 24° C., while the phase change temperature between $S_A$ phase and $S_{CA}$* phase was unchanged.

EXAMPLE 3, 4

The liquid crystal compositions shown in Table 8 were prepared.

TABLE 8

| Example | Constitutional Formula | $R^1$ | $R^2$ | $R^3$ | Composition (wt %) |
|---|---|---|---|---|---|
| 3 | 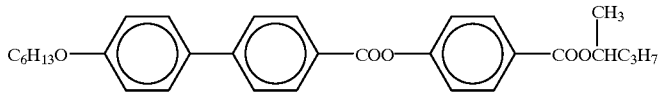 | H | $CH_3$ | $C_3H_7$ | 42.9 |
|   | 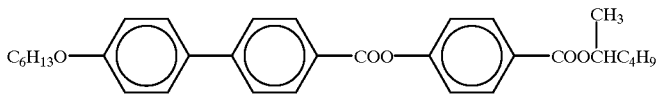 | H | $CH_3$ | $C_4H_9$ | 57.1 |
| 4 | 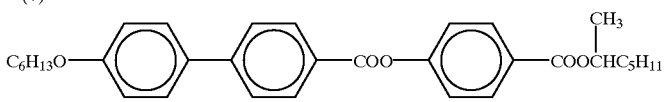 | H | $CH_3$ | $C_5H_{11}$ | 44.3 |

TABLE 8-continued

| Example | Constitutional Formula | R¹ | R² | R³ | Composition (wt %) |
|---|---|---|---|---|---|
| ← (+) C₆H₁₃O—⟨⟩—⟨⟩—COO—⟨⟩—COOCHC₆H₁₃ (CH₃) | | H | CH₃ | C₆H₁₃ | 55.7 |

In case of Example 3, where both liquid crystals were (+), the crystallization temperature was 104° C., while where a clockwise body and a counterclockwise body were mixed, the crystallization temperature was 84° C., which decreased the crystallization temperature by 20° C.

EXAMPLE 5, 6

The liquid crystals shown in the following Table 9 were prepared.

TABLE 9

| Example | Constitutional Formula | Composition (wt %) |
|---|---|---|
| 5 | (-)C₈H₁₇O—⟨⟩—⟨⟩—COO—⟨⟩—COOCH(CH₃)—C₆H₁₃ | 51 |
|   | (+)C₈H₁₇O—⟨⟩—⟨⟩—COO—⟨⟩—COOCH(CF₃)—C₆H₁₃ | 49 |
| 6 | (-)C₈H₁₇O—⟨⟩—⟨⟩—COO—⟨⟩—COOCH(CH₃)—C₆H₁₃ | 45 |
|   | (+)C₈H₁₇COO—⟨⟩—⟨⟩—COO—⟨⟩—COOCH(CF₃)—C₆H₁₃ | 55 |

In Example 5, where only the stereo configuration was different, the estimated crystallization temperature calculated as an ideal solution was 58° C. In comparison to this, the measured temperature was 54° C., which is lower by 4° C.

In case of Example 6, where the stereo configuration was different and $X^1$ was also different, the estimated crystallization temperature calculated as an ideal solution was 57° C. In comparison to this, the measured temperature was 43° C., which is lower by 14° C.

From the results of Examples 5 and 6, the composition comprising compounds represented by the formula (II) which are different not only in stereo configuration but also in $X^1$ significantly decreases the crystallization temperature.

What is claimed is:

1. An antiferroelectric liquid crystal composition having an antiferroelectric phase comprising a mixture consisting of a first and second group of one or more compounds represented by the following general formula (I):

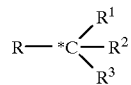

wherein

C* represents an asymmetric carbon;

$R^1$, $R^2$ and $R^3$ represent an atom or an atomic group where $R^3$ has more carbon atoms than $R^2$ and $R^2$ has more carbon atoms than $R^1$, or, if two or more of $R^1$, $R^2$ and $R^3$ have the same number of carbon atoms, $R^1$, $R^2$ and $R^3$ represent an atom or an atomic group of increasing atomic weight or increasing atomic group weight;

the first group of one or more compounds of the mixture has $R^1$, $R^2$ and $R^3$ arranged clockwise when the molecule is viewed along the R—C* bond, with the C* atom in front, the second group of one or more compounds of the mixture has $R^1$, $R^2$ and $R^3$ arranged counterclockwise, and at least one compound of the first group is different in structural formula from each of the one or more compounds of the second group or at least one compound of the second group is different in structural formula from each of the one or more compounds of the first group; and R is the atomic group having the most carbon atoms and represents in the formula (I) the part enclosed by the dotted line in the following formula (II):

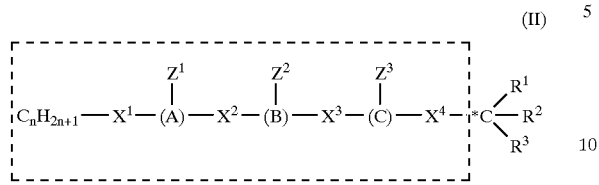

wherein n is an integer from 4 to 14;

A, B and C are selected from group (III) consisting of the following components;

$X^1$, $X^2$, and $X^3$ and $X^4$ are selected from group (IV) consisting of the following components; and $Z^1$, $Z^2$ and $Z^3$ are selected from group (V) consisting of the following components:

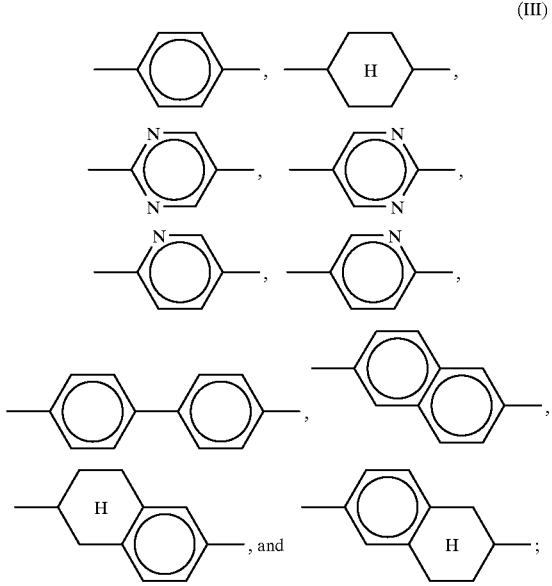

(IV) single bond (—), —COO—, —OCO—, —CO, —O—, and —C≡C—; and (V) H, F, Cl, Br, CN, and $CH_3$.

2. The antiferroelectric liquid crystal composition according to claim 1, wherein $R^1$ is selected from the group consisting of H, $CH_3$, $C_2H_5$, $C_3H_7$, $CF_3$ and $C_2F_5$.

3. The antiferroelectric liquid crystal composition according to claim 2, wherein $R^1$ is H.

4. The antiferroelectric liquid crystal composition according to claim 1, wherein $R^2$ is selected from the group consisting of $CH_3$, $CF_3$, $C_2H_5$, $C_3H_7$, $C_2F_5$, $CHF_2$ and $CH_2F$.

5. The antiferroelectric liquid crystal composition according to claim 4, wherein $R^2$ is selected from the group consisting of $CH_3$, $CF_3$ and $C_2H_5$.

6. The antiferroelectric liquid crystal composition according to claim 1, wherein $R^3$ is a straight chained or branched alkyl having 4 to 14 carbon atoms or

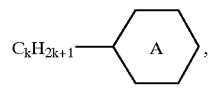

wherein k is an integer from 0 to 3 and

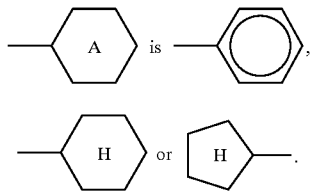

7. The antiferroelectric liquid crystal composition according to claim 6, wherein $R^3$ is a straight chained or branched alkyl having 4 to 8 carbon atoms.

8. The antiferroelectric liquid crystal composition according to claim 7, wherein $R^3$ is a straight chained or branched alkyl having 6 or 8 carbon atoms.

9. The antiferroelectric liquid crystal composition according to claim 1, wherein the mixture consisting of the first and second groups of compounds represented by the formulae (I) and (II) has at least two compounds which have different $X^1$.

10. A liquid crystal indication element comprising an antiferroelectric liquid crystal composition according to claim 1.

11. A liquid crystal indication element comprising an antiferroelectric liquid crystal composition according to claim 9.

12. An antiferroelectric composition according to claim 1, wherein the composition comprises 70 wt % or more of the mixture consisting of the first and second groups of compounds.

13. An antiferroelectric composition according to claim 1, wherein the ratio of the clockwise-arranged first group of the mixture to the counterclockwise-arranged second group of the mixture is from 20:80 to 80:20.

14. An antiferroelectric composition according to claim 1, wherein $R^1$ is hydrogen or a carbon-containing group, and $R^2$ and $R^3$ are each carbon-containing groups.

15. An antiferroelectric liquid crystal composition having an antiferroelectric phase comprising a mixture consisting of a first and a second group represented by the following general formula (I):

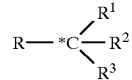

wherein C* represents an asymmetric carbon;

$R^1$, $R^2$ and $R^3$ represent an atom or an atomic group where $R^3$ has more carbon atoms than $R^2$ and $R^2$ has more carbon atoms than $R^1$, or, if two or more of $R^1$, $R^2$ and $R^3$ have the same number of carbon atoms, $R^1$, $R^2$ and $R^3$ represent an atom or an atomic group of increasing atomic weight or increasing atomic group weight;

the first group of the mixture consists of a plurality of compounds with $R^1$, $R^2$ and $R^3$ arranged clockwise when the molecule is viewed along the R—C* bond, with the C* atom in front, the second group of the mixture consists of a single compound with $R^1$, $R^2$ and $R^3$ arranged counterclockwise, and the single compound of the second group is different in structural formula from each of the compounds of the first group; and R is the atomic group having the most carbon atoms and represents in the formula (I) the part enclosed by the dotted line in the following formula (II):

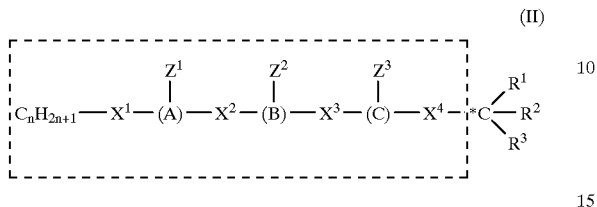

wherein n is an integer from 4 to 14;

A, B and C are selected from group (III) consisting of the following components;

$X^1$, $X^2$, $X^3$ and $X^4$ are selected from group (IV) consisting of the following components; and $Z^1$, $Z^2$ and $Z^3$ are selected from group (V) consisting of the following components:

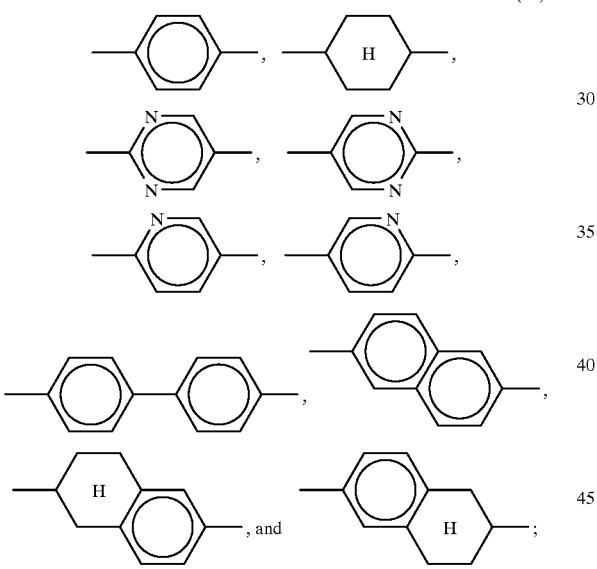

(IV) single bond (—), —COO—, —OCO—, —CO, —O—, and —C≡C—; and (V) H, F, Cl, Br, CN, and $CH_3$.

16. An antiferroelectric liquid crystal composition having an antiferroelectric phase comprising a mixture consisting of a first and second group of one or more compounds represented by the following general formula (I):

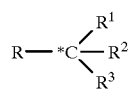

wherein

C* represents an asymmetric carbon;

$R^1$, $R^2$ and $R^3$ represent an atom or an atomic group where $R^3$ has more carbon atoms than $R^2$ and $R^2$ has more carbon atoms than $R^1$, or, if two or more of $R^1$, $R^2$ and $R^3$ have the same number of carbon atoms, $R^1$, $R^2$ and $R^3$ represent an atom or an atomic group of increasing atomic weight or increasing atomic group weight;

the first group of one or more compounds of the mixture has $R^1$, $R^2$ and $R^3$ arranged clockwise when the molecule is viewed along the R—C* bond, with the C* atom in front, the second group of one or more compounds of the mixture has $R^1$, $R^2$ and $R^3$ arranged counterclockwise, and each of the one or more compounds of the second group or first group are different in structural formula from each of the one or more compounds of the first group or second group; and R is the atomic group having the most carbon atoms and represents in the formula (I) the part enclosed by the dotted line in the following formula (II):

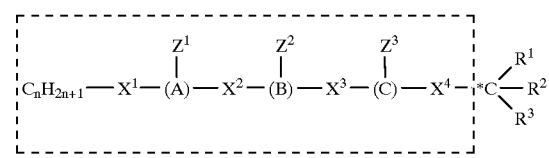

wherein n is an integer from 4 to 14;

A, B and C are selected from group (III) consisting of the following components;

$X^1$, $X^2$, $X^3$ and $X^4$ are selected from group (IV) consisting of the following components; and $Z^1$, $Z^2$ and $Z^3$ are selected from group (V) consisting of the following components:

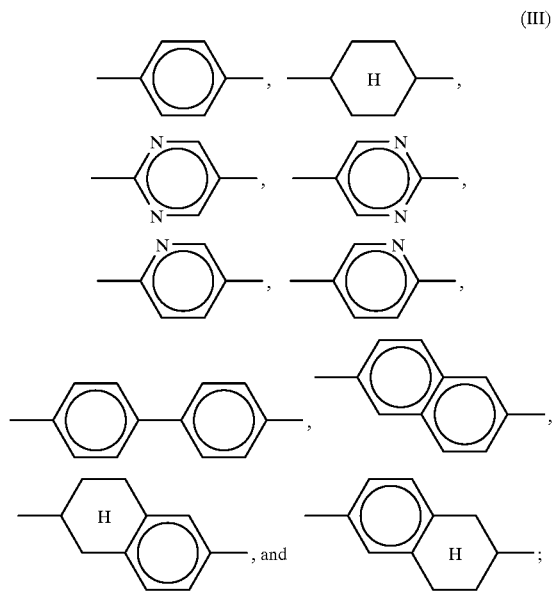

(IV) single bond (—), —COO—, —OCO—, —CO, —O—, and —C≡C—; and (V) H, F, Cl, Br, CN, and $CH_3$.

17. An antiferroelectric composition according to claim 16, wherein the composition comprises 70 wt % or more of the mixture consisting of the first and second group of one or more compounds.

* * * * *